(12) United States Patent
Choi et al.

(10) Patent No.: US 12,416,993 B2
(45) Date of Patent: Sep. 16, 2025

(54) ELECTRONIC DEVICE, AND NOTIFICATION AND CONNECTION METHOD FOR ELECTRONIC PEN

(71) Applicant: SAMSUNG ELECTRONICS CO., LTD., Suwon-si (KR)

(72) Inventors: Jaeho Choi, Suwon-si (KR); Seonghun Kim, Suwon-si (KR); Kwangtaek Woo, Suwon-si (KR); Changho Lee, Suwon-si (KR); Jinwan An, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/778,505

(22) Filed: Jul. 19, 2024

(65) Prior Publication Data
US 2024/0377904 A1 Nov. 14, 2024

Related U.S. Application Data

(63) Continuation of application No. PCT/KR2022/021431, filed on Dec. 27, 2022.

(30) Foreign Application Priority Data

Jan. 25, 2022 (KR) .................. 10-2022-0010592
Mar. 31, 2022 (KR) .................. 10-2022-0040396

(51) Int. Cl.
*G06F 3/041* (2006.01)
*G06F 3/0354* (2013.01)

(52) U.S. Cl.
CPC ...... *G06F 3/04162* (2019.05); *G06F 3/03545* (2013.01)

(58) Field of Classification Search
CPC .. G06F 3/04162; G06F 3/03545; G06F 3/038; G06F 3/0484; G06F 3/0354; G06F 3/0383
See application file for complete search history.

(56) References Cited

U.S. PATENT DOCUMENTS 10,782,799 B2     9/2020   Nicholson et al.
10,877,578 B2 *  12/2020   Hisano .................. G06F 3/0446
(Continued)

FOREIGN PATENT DOCUMENTS

CN      111083943 A      4/2020
CN      113760124 A     12/2021
(Continued)

OTHER PUBLICATIONS

International Search Report for International Application No. PCT/KR2022/021431; International Filing Date Dec. 27, 2022; International Search Report Mail Date Mar. 24, 2023; 3 Pages.
(Continued)

*Primary Examiner* — Jonathan A Boyd
(74) *Attorney, Agent, or Firm* — CANTOR COLBURN LLP

(57) ABSTRACT

A notification and connection method for an electronic pen is provided. Aspects include receiving a touch input of a first electronic pen to a display, identifying whether the first electronic pen is connected to an electronic device through a communication module in response to receiving the touch input, and identifying whether a second electronic pen is connected to the electronic device in response to identifying that the first electronic pen is not connected to the electronic device. Aspects also include transmitting a notification signal to the second electronic pen in response to identifying that the second electronic pen connected to the electronic device is present and establishing communication connection with the first electronic pen in response to identifying
(Continued)

that the second electronic pen is not connected to the electronic device.

11 Claims, 10 Drawing Sheets

(56) References Cited

U.S. PATENT DOCUMENTS

| | | | |
|---|---|---|---|
| 11,048,360 B2* | 6/2021 | Jang | G06F 3/04162 |
| 11,132,072 B2 | 9/2021 | Jeon et al. | |
| 11,307,618 B2 | 4/2022 | Seo et al. | |
| 11,327,582 B2 | 5/2022 | Kim et al. | |
| 11,874,978 B2 | 1/2024 | Kang et al. | |
| 12,001,617 B1* | 6/2024 | Jung | G06F 3/03545 |
| 2003/0229859 A1 | 12/2003 | Shiraishi et al. | |
| 2020/0019255 A1 | 1/2020 | Gilbert et al. | |
| 2020/0097118 A1* | 3/2020 | Kang | H04L 69/08 |
| 2020/0103988 A1 | 4/2020 | Jeon et al. | |

FOREIGN PATENT DOCUMENTS

| | | |
|---|---|---|
| JP | H11282614 A | 10/1999 |
| KR | 20030091766 A | 12/2003 |
| KR | 101221895 B1 | 1/2013 |
| KR | 20180129295 A | 12/2018 |
| KR | 101984591 B1 | 5/2019 |
| KR | 20200017042 A | 2/2020 |
| KR | 20200036374 A | 4/2020 |
| KR | 20210017099 A | 2/2021 |
| KR | 20210034358 A | 3/2021 |
| KR | 102498813 B1 | 2/2023 |

OTHER PUBLICATIONS

Extended European Search Report Issued In EP Application No. 22924394.4-1218; Mail Date Feb. 26, 2025; 12 Pages.

* cited by examiner

ELECTRONIC DEVICE, AND NOTIFICATION AND CONNECTION METHOD FOR ELECTRONIC PEN

CROSS-REFERENCE TO RELATED APPLICATIONS

This application is a continuation application, claiming priority under § 365 (c), of International Application No. PCT/KR2022/021431, filed on Dec. 27, 2022, which is based on and claims the benefit of Korean Patent Application No. 10-2022-0040396, filed on Mar. 31, 2022, and Korean Patent Application No. 10-2022-0010592, filed on Jan. 25, 2022, in the Korean Intellectual Property Office, the disclosures of which are incorporated by reference herein in their entireties.

BACKGROUND

This disclosure relates to an electronic device, for example, a technology for transmitting a notification to an electronic pen and establishing communication connection with the electronic pen by using an electronic device.

With the development of mobile communication technologies and hardware/software technologies, portable electronic devices (hereinafter, referred to as 'electronic devices') have been able to implement a variety of functions beyond traditional calling functions. The electronic device may provide various functions to a user by means of an interaction with an external device. For example, the electronic device may receive a touch input made by a stylus and perform predetermined various functions.

The electronic device may establish communication connection, such as Bluetooth connection, with a stylus and send or receive signals to or from the stylus. In the case that the stylus touches a display of the electronic device, the electronic device may provide functions that are correlated with various inputted frequencies. For example, the electronic device may provide a first function mapped to a first frequency when receiving the first frequency, and the electronic device may provide a second function mapped to a second frequency when receiving the second frequency.

SUMMARY

An electronic pen interacts with an electronic device by using frequencies, and the electronic device may receive a touch input when the same frequencies are used even without using an electronic pen in communication connection with the electronic device. However, there is a problem in that in the case that a user touches the electronic device in the related art with a pen, which is not in communication connection with the electronic device, the electronic device may only receive a touch input but cannot support various operations by using the communication connection. Therefore, even though the user intends to use the electronic pen connected to the electronic device, the user has difficulty in recognizing which electronic pen the electronic device is in communication connection with, in the case that the user owns multiple electronic pens.

In addition, the electronic device in the related art has a problem in that it is inconvenient to use the electronic pen because an electronic pen control menu is created only when the user touches the display in the case that the user intends to control the electronic pen by using the electronic device.

Various embodiments provide a method of notifying the user of an electronic pen that is in communication connection with the electronic device or establishing communication connection with an electronic pen that currently inputs a touch in the case that the user intends to find the electronic pen that is in communication connection with the electronic device or manipulate the electronic pen.

An electronic device according to various embodiments may include: a display; a communication module; a memory; and a processor operatively connected to the display, the communication module, and the memory, in which the processor is configured to: receive a touch input of a first electronic pen to the display; identify whether the first electronic pen is connected to the electronic device through the communication module in response to receiving the touch input; identify whether there is an electronic pen connected to the electronic device in response to identifying that the first electronic pen is not connected to the electronic device; transmit a notification signal to a second electronic pen in response to identifying that the second electronic pen connected to the electronic device is present; and establish communication connection with the first electronic pen in response to identifying that there is no electronic pen connected to the electronic device.

An electronic pen according to various embodiments may include: a communication module; a memory; and a processor operatively connected to the communication module and the memory, in which the processor is configured to: transmit a communication signal to the electronic device in response to detecting a resonant frequency; receive a response signal corresponding to the communication signal; and transmit a control signal to the electronic device in response to receiving the response signal.

A notification and connection method for an electronic pen according to various embodiments may include: receiving a touch input of a first electronic pen to a display; identifying whether the first electronic pen is connected to an electronic device through a communication module in response to receiving the touch input; identifying whether there is an electronic pen connected to the electronic device in response to identifying that the first electronic pen is not connected to the electronic device; transmitting a notification signal to a second electronic pen in response to identifying that the second electronic pen connected to the electronic device is present; and establishing communication connection with the first electronic pen in response to identifying that there is no electronic pen connected to the electronic device.

According to various embodiments, in the case that the electronic pen, which is not in communication connection, touches the display, the electronic device may identify whether there is an electronic pen currently being in communication connection. In the case that there is no electronic pen currently being in communication connection, the electronic device may establish communication connection with the electronic pen that currently touches the display. In the case that there is an electronic pen currently being in communication connection, the electronic device may transmit a notification to the electronic pen that is in communication connection. According to the embodiment, in the case that a motion of the electronic pen that is in communication connection is detected, the electronic device may display a graphic object, which indicates the electronic pen on the display, and notify the user that the electronic pen, which currently touches the display, is in communication connection.

Other effects, which may be obtained or expected by various embodiments of the present electronic device, will be directly or implicitly disclosed in the detailed description on the embodiments of the present electronic device. For example, various effects expected according to various embodiments of the electronic device will be disclosed in the detailed description to be described below.

DETAILED DESCRIPTION

Hereinafter, embodiments of the present disclosure will be described in detail with reference to the accompanying drawings.

When describing the embodiments, a description of technical contents, which are well known in the technical field to which the present disclosure pertains but are not directly related to the present disclosure, will be omitted. In addition, a detailed description of constituent elements having substantially the same configurations and functions will be omitted.

For the same reason, some constituent elements in the accompanying drawings are illustrated in an exaggerated or schematic form or are omitted, and the size of each constituent element does not entirely reflect an actual size. Therefore, the present disclosure is not limited to relative sizes or intervals drawn in the accompanying drawings.

Figure 1:
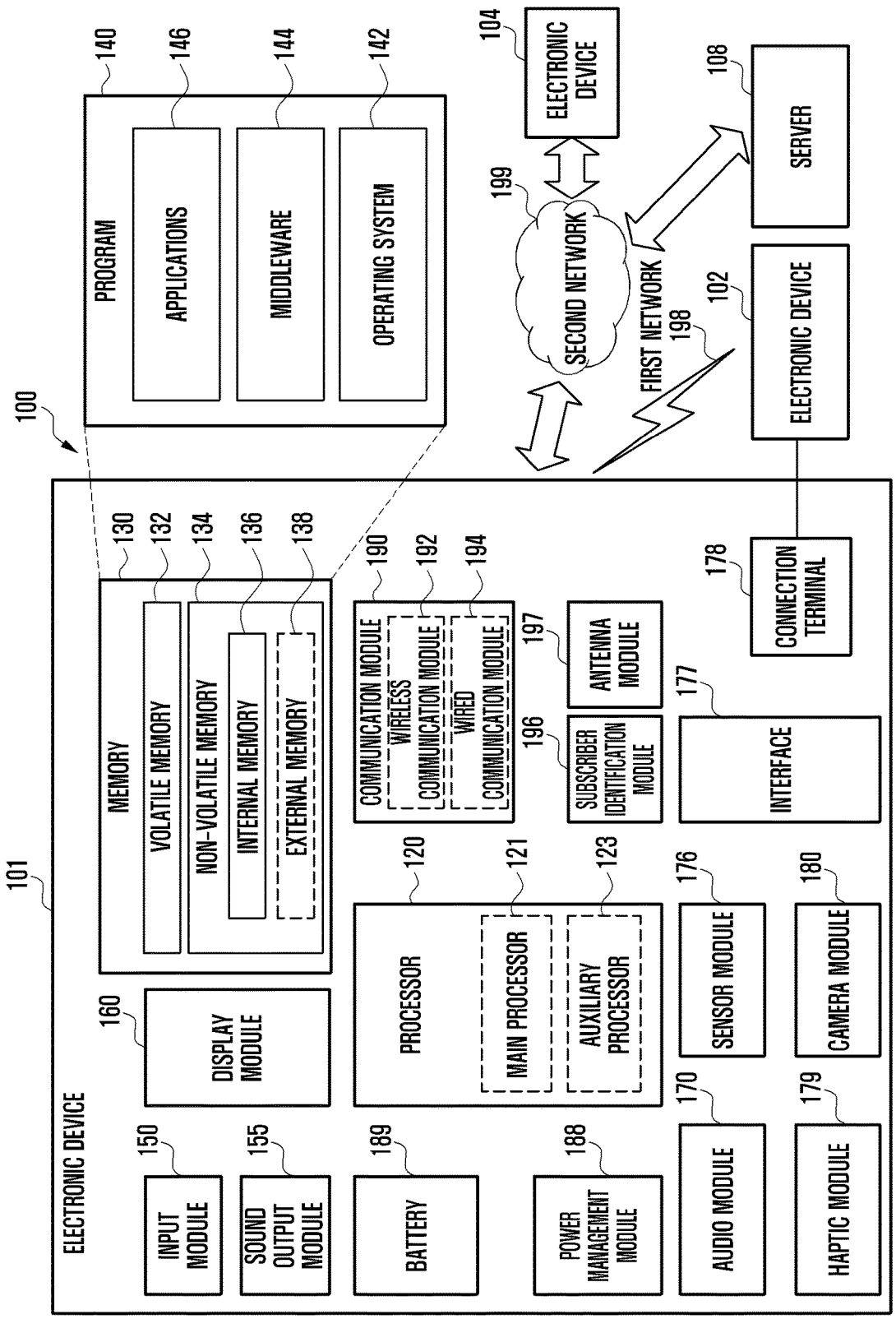
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
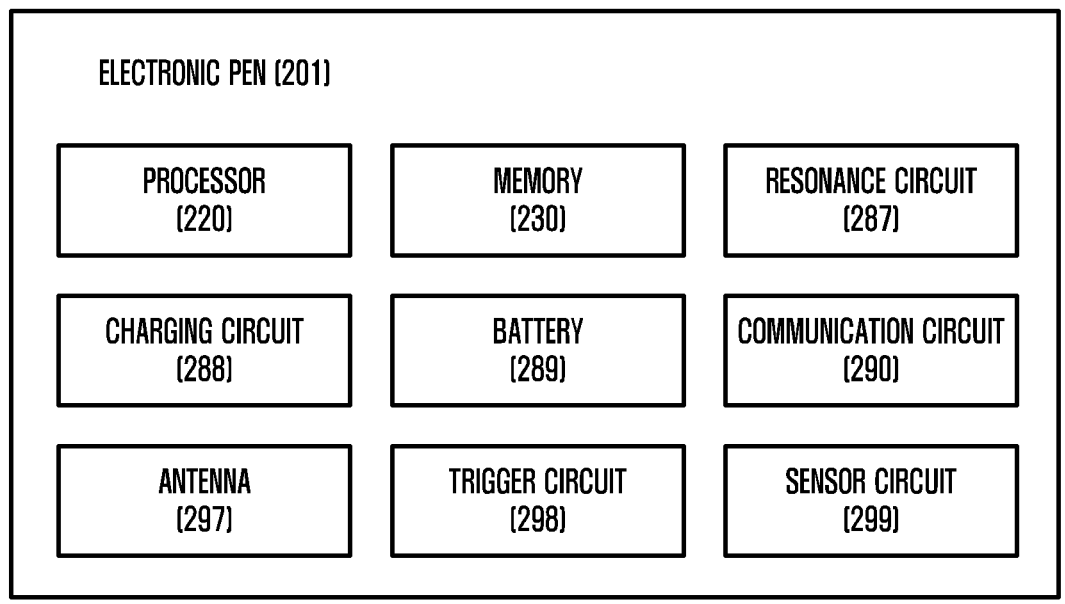
FIG. 2 is a block diagram illustrating an electronic pen according to various embodiments.

FIG. 2 is a block diagram illustrating an electronic pen according to various embodiments.

With reference to FIG. 2, an electronic pen 201 according to an embodiment may include a pen processor 220, a memory 230, a resonance circuit 287, a charging circuit 288, a battery 289, a communication circuit 290, an antenna 297, a trigger circuit 298, and/or a sensor circuit 299. In some embodiments, the pen processor 220, at least a part of the resonance circuit 287, and/or at least a part of the communication circuit 290 may be provided on a printed circuit board or configured in the form of a chip. The pen processor 220, the resonance circuit 287, and/or the communication circuit 290 may be electrically connected to the memory 230, the charging circuit 288, the battery 289, the antenna 297, the trigger circuit 298, and/or the sensor circuit 299.

The pen processor 220 may include a generic processor configured to execute a customized hardware module or software (e.g., application programs). The pen processor 220 may include software elements (programs) or hardware constituent elements (functions) including at least one of various sensors provided in the electronic pen 201, a data measurement module, an input/output interface, a module for managing an environment or a state of the electronic pen 201, and a communication module. For example, the pen processor 220 may include one of hardware, software, and firmware or a combination of two or more of hardware, software, and firmware.

According to the embodiment, the pen processor 220 may be configured to provide an electronic device 101, through the communication circuit 290, with information indicating a pushed state of a button, sensing information acquired by the sensor circuit 299, and/or information (e.g., information related to a position of the electronic pen 201) calculated on the basis of the sensing information.

The resonance circuit 287 may include a coil (or inductor) and/or a capacitor. The resonance circuit 287 may resonate on the basis of an electromagnetic field signal generated from the digitizer (e.g., the display module 160 in FIG. 1) of the electronic device 101 and emit electromagnetic resonance (EMR) input signals (or magnetic fields) by resonance. In the case that the electronic pen 201 transmits signals by the EMR method, the electronic pen 201 may generate a signal including resonant frequencies on the basis of an electromagnetic field generated from an inductive panel of the electronic device 101. In the case that the electronic pen 201 transmits signals by an active electrostatic (AES) method, the electronic pen 201 may generate a signal by using capacity coupling with the electronic device 101. In the case that the electronic pen 201 transmits signals by an electrically coupled resonance (ECR) method, the electronic pen 201 may generate a signal including resonant frequencies on the basis of an electric field generated from a capacitive device of the electronic device.

The electronic device 101 may identify a position of the electronic pen 201 on the electronic device 101 by using the electromagnetic resonance input signal. For example, the electronic device 101 may identify a position of the electronic pen 201 on the basis of a magnitude of an induced electromotive force (e.g., output electric current) generated by the electromagnetic resonance input signal in each of a plurality of channels (e.g., a plurality of loop coils) in the digitizer. Meanwhile, the configuration has been described above in which the electronic device 101 and the electronic pen 201 are operated by the EMR method. However, this configuration is provided for illustrative purposes only. The electronic device 101 may generate a signal based on the electric field on the basis of the electrically coupled resonance (ECR) method. The resonance circuit of the electronic pen 201 may be resonated by an electric field. The electronic device 101 may identify an electric potential in the plurality of channels (e.g., electrodes) by the resonance of the electronic pen 201. The electronic device 101 may identify the position of the electronic pen 201 on the basis of electric potential. The electronic pen 201 may be implemented using the active electrostatic (AES) method. It may be understood by those skilled in the art that the type of implemented electronic pen is not limited.

According to the embodiment, the resonance circuit 287 may be used to change the intensity or frequency of the electromagnetic field in accordance with the user's manipulation state. For example, the resonance circuit 287 may provide various frequencies for recognizing a hovering input, a drawing input, a button input, or an erasing input. For example, the resonance circuit 287 may provide various resonant frequencies in accordance with a connection combination of a plurality of capacitors or provide various resonant frequencies based on a variable inductor and/or a variable capacitor.

The memory 230 may store information related to an operation of the electronic pen 201. For example, the information may include information for communication with the electronic device 101 and frequency information related to an input operation of the electronic pen 201. Further, the memory 230 may store a program (or application, algorithm, or processing loop) for calculating information (e.g., coordinate information and/or displacement information) related to the position of the electronic pen 201 from sensing data of the sensor circuit 299. The memory 230 may store a communication stack of the communication circuit 290. According to the implementation, the communication circuit 290 and/or the pen processor 220 may include a dedicated memory.

The communication circuit 290 may be configured to perform wireless communication function between the electronic pen 201 and a communication module 190 of the electronic device 101. According to the embodiment, the communication circuit 290 may provide the electronic device 101 with state information, input information, and/or information related to the position of the electronic pen 201 by using a near field communication method. For example, the communication circuit 290 may provide the electronic device 101 with information (e.g., motion sensor data) on a direction of the electronic pen 201 acquired by the sensor circuit 299, voice information inputted through a microphone, or information related to a residual capacity of the battery 289. For example, the communication circuit 290 may provide the electronic device 101 with information related to sensing data acquired from the sensor circuit 299 and/or the position of the electronic pen 201 identified on the basis of the sensing data. For example, the communication circuit 290 may provide the electronic device 101 with information related to a state of a button included in the electronic pen 201 acquired through the trigger circuit 298. For example, the near field communication method may include at least one of Bluetooth, Bluetooth low energy (BLE) NFC, Wi-Fi direct, ultra wideband (UWB), and wireless LAN. However, the type of field communication method is not limited.

The antenna 297 may be used to transmit or receive signals or power to or from the outside (e.g., the electronic device 101). According to the embodiment, the electronic pen 201 may include a plurality of antennas 297 and select at least one antenna 297 suitable for the communication method among the plurality of antennas 297. The communication circuit 290 may exchange signals or power with the external electronic device through at least one selected antenna 297.

The trigger circuit 298 may include at least one button. According to the embodiment, the trigger circuit 298 may transmit a trigger signal to the electronic device 101 by using an input signal of the button.

According to the embodiment, the pen processor 220 may identify an input method (e.g., touch or push) of the button and the type of button (e.g., EMR button or BLE button) of the electronic pen 201 on the basis of the received trigger signal.

The sensor circuit 299 may generate electrical signals or data values corresponding to an internal operating state or an external environment state of the electronic pen 201. For example, the sensor circuit 299 may include at least one of a motion sensor, a battery residual capacity detection sensor, a pressure sensor, an optical sensor, a temperature sensor, a geomagnetic sensor, and a biosensor.

The sensor circuit 299 may include an acceleration sensor (accelerometer), a gyro sensor, and/or a geomagnetic sensor. The acceleration sensor may sense information on a linear motion of the electronic pen 201 and/or acceleration of the electronic pen 201 with respect to three axes, six axes, or nine axes. The gyro sensor may sense information related to a rotation of the electronic pen 201. The geomagnetic sensor may sense information on a state (e.g., posture (orientation)) in which the electronic pen 201 is inclined. The sensor circuit 299 may include not only a sensor for measuring a motion, but also a sensor capable of generating electrical signals or data values corresponding to an internal operating state or an external environment state of the electronic pen 201. For example, the sensor circuit may include at least one of the battery residual capacity detection sensor, the pressure sensor, the optical sensor, the temperature sensor, and the biosensor. The biosensor may sense the manner in which the electronic pen 201 is being held by a user, i.e., a style of the grip that the user has on the electronic pen 201. The pen processor 220 may transmit the information, which is acquired from the sensor circuit 299, to the electronic device 101 through the communication circuit 290. Alternatively, on the basis of the information acquired from the sensor circuit 299, the pen processor 220 may transmit information, which is related to the position of the electronic pen 201 (e.g., a coordinate of the electronic pen 201 and/or a displacement of the electronic pen 201), to the electronic device 101 through the communication circuit 290.

Figure 3:
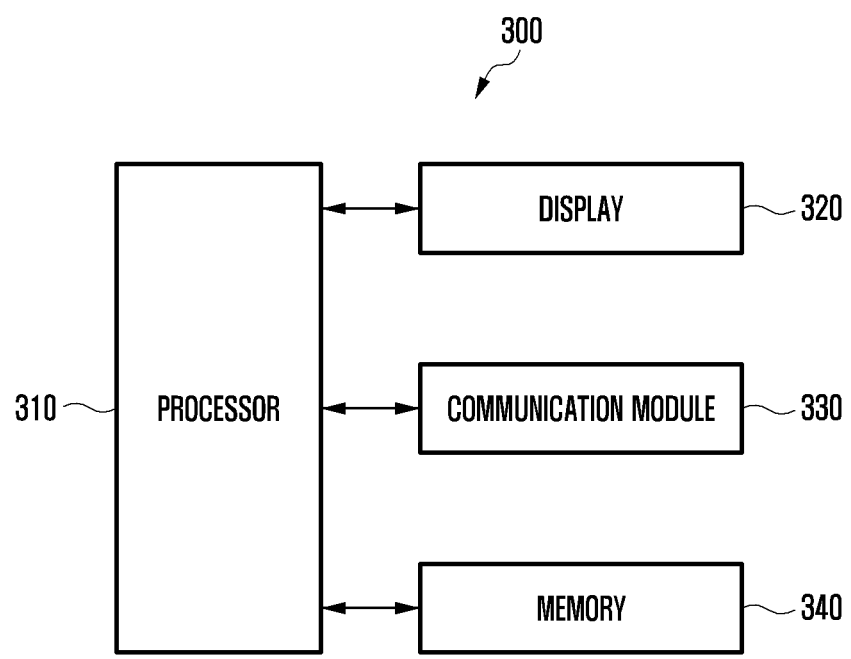
FIG. 3 is a block diagram illustrating the electronic device according to various embodiments of the present disclosure.

With reference to FIG. 3, an electronic device 300 according to the embodiment may include a display 320 (e.g., the display module 160 in FIG. 1), a communication module 330 (e.g., the communication module 190 in FIG. 1), a processor 310 (e.g., the processor 120 in FIG. 1), and/or a memory 340 (e.g., the memory 130 in FIG. 1).

According to the embodiment, the electronic device 300 may accommodate or attach the electronic pen (e.g., the electronic pen 201 in FIG. 2) in an internal space or an external space of the electronic device 300. However, the present disclosure is not limited thereto. According to any embodiment, the electronic pen 201 may be configured as a separate external input device.

The display 320 may include an input/output device configured to perform an input function and a display function. The display 320 may include at least some of the configurations of the display module 160 in FIG. 1 and/or at least some of the functions of the input module 150 in FIG. 1. The display 320 may refer to a flat display or a flexible display. The display 320 may include at least one display.

The display 320 may display a graphic user interface (GUI) element and/or visual information (e.g., text, graphic, image, video, or a combination thereof).

According to the embodiment, the display 320 may be coupled to or disposed adjacent to a touch detection circuit, a pressure sensor capable of measuring intensity (pressure) of a touch, and/or a digitizer circuit configured to detect the electronic pen 201. The display 320 may be a touch-sensitive display. The touch-sensitive display may detect a touch, a touch gesture, an air gesture, or a hovering (or proximity touch) input made by using a user's finger (or other body parts). The touch-sensitive display may detect a touch, an air command, or a hovering input of the electronic pen 201.

According to the embodiment, the display 320 may perform a function corresponding to the input signal of the electronic pen 201 and display a user interface (UI) related to the function. For example, the display 320 may provide the user with a pen theme UI related to the electronic pen 201.

The communication module 330 may perform near field communication connection with the electronic pen 201 (e.g., a stylus pen detached from the electronic device 300 or a stylus pen provided separately from the electronic device 300). For example, the communication module 330 may perform communication with the electronic pen 201 by using (Bluetooth low energy (BLE)) that is one of various types of near field communication methods. However, the present disclosure is not limited thereto. The communication module 330 may perform communication connection between the communication module 330 and the electronic pen 201 when the electronic pen 201 is positioned within a distance in which the near field communication connection may be performed. The communication module 330 according to various embodiments may include at least some of configurations and/or functions of the communication module 190 in FIG. 1.

For example, the communication module 330 may receive electronic pen information (or sensor information) from the electronic pen 201. For example, the electronic pen information may include at least one of coordinate information related to a hovering input, gradient information, and action coordinate information related to an air command.

The processor 310 may be configured to control the constituent elements of the electronic device 101 and/or perform computation or data processing related to communication and include at least some of the configurations and/or functions of the processor 120 in FIG. 1. The operations of the processor 310, which will be described below, may be performed by loading instructions stored in the memory 340.

The memory 340 may be operatively connected to the processor 310 and store data and various instructions capable of being executed by the processor 310. The above-mentioned instructions may include control instructions such as arithmetic and logical operations, data movements, input/output, and the like that may be recognized by the processor 310.

The memory 340 may store a program for performing the function corresponding to the control signal in accordance with the input of the electronic pen 201 or store a program (or application) for supporting an electronic pen theme configuration.

According to the embodiment, the processor 310 may execute a pen theme application (hereinafter, referred to as an 'app') and display a user interface, which is provided by the pen theme app, on the display 320. The pen theme app may be an app capable of changing and/or configuring graphic objects (e.g., an air command UI or an electronic pen pointer object) or a pen sound related to the electronic pen 201 in accordance with user preference.

According to the embodiment, the processor 310 may control the performance of operations or functions related to the pen theme app. The processor 310 may display an electronic pen pointer corresponding to a hovering input of the electronic pen 201. For example, the processor 310 may display a hovering object (e.g., dot pointer) configured as a default. In the case that the user changes the electronic pen pointer theme by using the pen theme app, the processor 310 may display a modified hovering object (e.g., modified pointer) to which the pen theme is applied.

According to the embodiment, the processor 310 may change the position of the electronic pen pointer by determining, adaptively (or in real time or automatically), the direction and coordinate of the electronic pen pointer displayed on the display 320 in consideration of at least some of visual characteristics of the electronic pen pointer, a situation of the electronic pen 201, and a situation of the display 320.

According to various embodiments, the processor 310 may be operatively, functionally, and/or electrically connected to the components of the electronic device 300 (e.g., the display 320, the communication module 330, and the memory 340) and configured to control the components, perform computation related to communication, and/or process data. The processor 310 may include at least some of the configurations and/or functions of the processor 120 in FIG. 1.

According to various embodiments, the processor 310 is not limited to computation and data processing functions that may be implemented in the electronic device 300. However, hereinafter, various embodiments will be described in which the electronic device 300 is used to establish communication connection with the electronic pen and transmit a notification signal to the electronic pen. The operations of the processor 310, which will be described below, may be performed by loading the instructions stored in the memory 340.

According to various embodiments, the processor 310 may receive a touch input of the electronic pen to the display 320. The display 320 may include a touch panel capable of detecting the touch input of the electronic pen. For example, when the user holds a first electronic pen and touches the display 320 of the electronic device 300, the processor 310 may use the touch panel and receive the touch input of the first electronic pen to the display 320. In this case, the touch input, which is received by the processor 310, may be different from a communication signal (e.g., Bluetooth signal) to be described below. Hereinafter, the electronic pen, which touches the display 320, will be described as the first electronic pen.

According to various embodiments, in response to receiving the touch input, the processor 310 may identify whether the first electronic pen is in communication connection with the electronic device 300. According to the embodiment, in the case that the electronic pen, which is in communication connection with the electronic device 300, touches the display 320, the processor 310 may receive a communication signal simultaneously with the touch input or in a predetermined time interval. The communication signal may include a serial number or a separate pen ID of the electronic pen. For example, in the case that the first electronic pen is in communication connection with the electronic device 300, the processor 310 may receive the communication signal within the predetermined time interval or at the same time when the user touches the display 320 with the first electronic pen. According to another embodiment, in the case that the user initially touches the display 320 with the first electronic pen, the processor 310 may acquire the communication signal. Thereafter, the processor 310 may not acquire the communication signal for a predetermined time even though the first electronic pen touches the display 320. For example, the pen processor of the first electronic pen transmits the communication signal to the electronic device when the first electronic pen initially touches the display 320 of the electronic device. After the initial touch, the pen processor may transmit the communication signal only when a time interval between the previous touch and the current touch is larger than a predetermined time interval. Therefore, in the case that the processor 310 receives the touch input of the electronic pen that is in communication connection with the electronic device 300, the processor 310 may also receive the communication signal. The processor 310 may not receive the communication signal in the case that the processor 310 receives the touch input of the electronic pen that is not in communication connection with the electronic device 300. According to the embodiment, in the case that the processor 310 receives the touch input and the communication signal at the same time or in the predetermined time interval, the processor 310 may determine that the electronic pen, which currently touches the display 320, is in communication connection with the electronic device 300. In the case that the processor 310 does not receive the touch input and the communication signal at the same time or in the predetermined time interval, the processor 310 may determine that the electronic pen, which currently touches the display 320, is not in communication connection with the electronic device 300.

According to various embodiments, the processor 310 may perform a predetermined operation in response to determining that the first electronic pen is in communication connection with the electronic device 300. The processor 310 may perform a predetermined operation in accordance with the touch input and/or the hovering gesture of the electronic pen. For example, the processor 310 may perform a writing or erasing operation on the basis of the frequencies of the communication signals received from the electronic pen.

According to various embodiments, the processor 310 may identify whether there is another electronic pen that is in communication connection with the electronic device 300 in response to determining that the first electronic pen is not in communication connection with the electronic device 300. For example, in the case that the display 320 receives the touch input of the first electronic pen without receiving the communication signal, the processor 310 may use the communication module 330 of the electronic device 300 and identify whether there is an electronic pen that is in communication connection with the electronic device 300. According to the embodiment, the processor 310 may identify that a second electronic pen that is in communication connection with the electronic device 300 is present. According to another embodiment, the processor 310 may identify that there is no electronic pen that is in communication connection with the electronic device 300.

According to various embodiments, the processor 310 may transmit a notification signal to the second electronic pen in response to identifying that the second electronic pen in communication connection with the electronic device 300 is detected. The notification signal may trigger one or more of a vibration, a sound, and a light on the second electronic pen. For example, the processor 310 may transmit the notification signal, which triggers vibration of the second electronic pen. The pen processor 310 of the second electronic pen may receive the notification signal and operate a vibration motor. The user may identify that the second electronic pen, which generates vibration, is in communication connection with the electronic device 300, and the user may touch the display 320 with the corresponding pen.

According to various embodiments, the processor 310 may establish the communication connection with the first electronic pen in response to identifying that there is no other electronic pen that is in communication connection with the electronic device 300. The processor 310 may establish the communication connection with the first electronic pen by using the communication module 330. The processor 310 may use the memory 340 and identify whether the first electronic pen has previously established the communication connection with the electronic device 300. According to the embodiment, in the case that there is a record indicating that the first electronic pen has previously established the communication connection with the electronic device 300, the processor 310 may immediately establish the communication connection of the first electronic pen with the electronic device 300. According to another embodiment, in the case that the first electronic pen has not previously established the communication connection with the electronic device 300, the processor 310 may output a guide for pairing the first electronic pen and the electronic device 300 to the display 320. That is, the processor 310 may provide the guide for the connection of the electronic pen when the electronic pen is initially connected to the electronic device 300.

The processor 310 may display a menu icon capable of controlling the electronic pen on the display 320 on the basis of a motion of the pen that is in communication connection with the electronic device 300.

According to various embodiments, the processor 310 may acquire information on the motion of the electronic pen from the pen processor 310 of the electronic pen. The pen processor 310 may acquire information on the motion of the electronic pen from the sensor circuit. The pen processor 310 may transfer the acquired motion information to the electronic device 300. For example, in the case that the user picks up the electronic pen that is in communication connection with the electronic device 300, the processor 310 may receive information, which indicates that the user has come into contact with the corresponding electronic pen, from the electronic pen.

According to various embodiments, the processor 310 may display a graphic object (e.g., menu icon), which is capable of controlling the electronic pen, on the display 320 in response to acquiring the information on the motion of the electronic pen. For example, the processor 310 may not display the graphic object when the user uses the electronic pen that is not in communication connection with the electronic device 300, and the processor 310 may display the graphic object when the user uses the electronic pen that is in communication connection with the electronic device.

According to various embodiments, the processor 310 may provide a menu capable of displaying information of the electronic pen and/or controlling the electronic pen on the basis of the user input related to the graphic object. For example, the processor 310 may display the serial number and status of the electronic pen on the basis of the user input related to the graphic object. For example, the processor 310 may provide a menu capable of releasing the communication connection with the electronic pen on the basis of the user input related to the graphic object.

Figure 4:
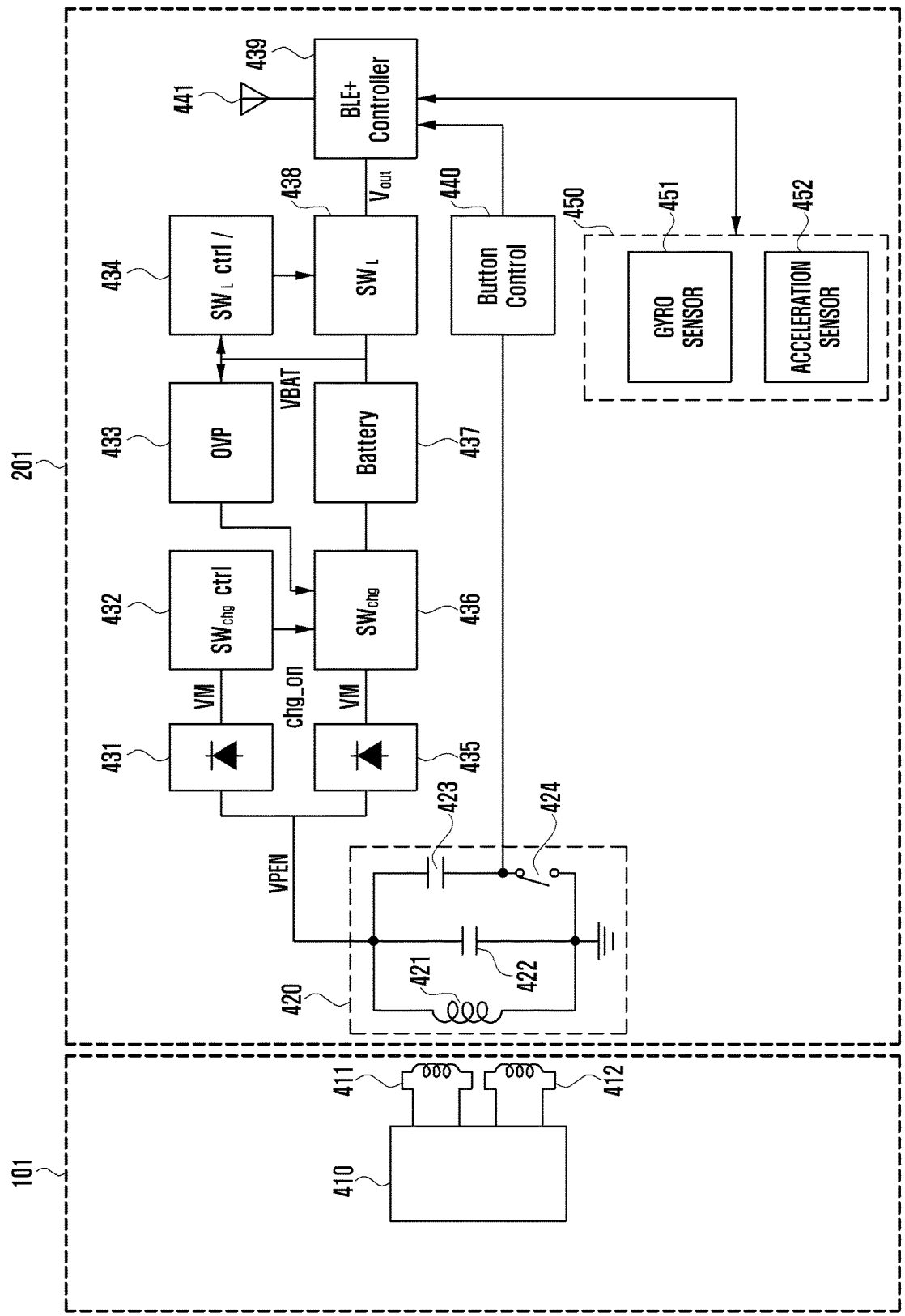
FIG. 4 is a view illustrating a configuration of the electronic device according to various embodiments of the present disclosure and a configuration of an external electronic device.

FIG. 4 is a view illustrating configurations of the electronic device 101 and the electronic pen 201 according to various embodiments of the present disclosure.

With reference to FIG. 4, according to the embodiment, the electronic device (e.g., the electronic device 101 in FIG. 1, 3, or 4) may communicate with the electronic pen (e.g., the electronic pen 201 in FIGS. 2 and 4). The electronic device 101 and the electronic pen 201 may communicate with each other through the communication circuit by using at least one of various types of near field communication methods. For example, the near field communication method may be Bluetooth low energy (BLE) communication. However, the present disclosure is not limited thereto.

The electronic device 101 may include a pen controller 410 (e.g., the processor 120 in FIG. 1 or the processor 310 in FIG. 3).

For example, the pen controller 410 may include at least one amplifier (not illustrated) connected to at least one of coils 411 and 412. The pen controller 410 may include at least one of the coils 411 and 412, and charging power may be provided to the electronic pen 201 through at least one of the coils 411 and 412.

According to the embodiment, at least one of the coils 411 and 412 may be disposed at a position physically adjacent to a coil 421 of the electronic pen 201 in the case that the electronic pen 201 is inserted into an internal space of the electronic device 101. However, the arrangement position is not limited. Meanwhile, the insertion into the internal space is an example. In addition to the internal space, the electronic device 101 may include an area (or space) in which the electronic pen 201 is mounted (or attached). In this case, the electronic pen 201 may be attached to or detached from the corresponding area (or space). At least some of the functions of the pen controller 410 may be performed by the processor 120. Alternatively, the pen controller 410 and the processor 120 may be integrated and implemented to at least some of the functions.

For example, the pen controller 410 may include a control circuit (e.g., control circuit independent of the processor 120), an inverter, and/or an amplifier in addition to at least one of the coils 411 and 412.

A resonance circuit 420 (e.g., the resonance circuit 287 in FIG. 2) of the electronic pen 201 may include the coil 421, at least one of capacitors 422 and 423, and/or a switch 424. In the case that the switch 424 is turned off, the coil 421 and the capacitor 422 may constitute the resonance circuit. In the case that the switch 424 is turned on, the coil 421 and the capacitors 422 and 423 may constitute the resonance circuit. Therefore, the resonant frequency of the resonance circuit 420 may change depending on the state in which the switch 424 is turned on or off. For example, the electronic device 101 may identify the on/off state of the switch 424 on the basis of the frequency of the signal from the electronic pen 201. For example, in the case that the button of the electronic pen 201 is pushed/released, the switch 424 may be turned on or off. The electronic device 101 may identify whether the button of the electronic pen 201 is pushed on the basis of the frequency of the received signal identified by the digitizer.

At least one rectifier 431 or 435 may commutate and output a signal VPEN with an alternating current waveform output from the resonance circuit 420. A charging switch controller (SWchg ctrl) 432 may receive a commutated signal VM output from the rectifier 431. On the basis of the commutated signal VM, the charging switch controller 432 may identify whether the signal generated from the resonance circuit 420 is a charging signal or a signal for detecting a position. For example, the charging switch controller 432 may identify whether the signal, which is generated from the resonance circuit 420, is the charging signal or the signal for detecting the position, for example, on the basis of a magnitude of a voltage of the commutated signal VM. Alternatively, the charging switch controller 432 may identify whether a signal having a charging initiation pattern is inputted on the basis of a waveform of the commutated signal VM.

The charging switch controller 432 may turn on or off the charging switch 436. The charging switch controller 432 may control the charging of a battery 437.

In the embodiment, the charging switch 436 may transmit charging power, which is received from the rectifier 435, to the battery 437 under the control of the charging switch controller 432.

In the case that the charging switch 436 is in an on state, the battery 437 may be charged by using a received commutated signal VIN. An over-voltage protection circuit (OVP) 433 may identify a battery voltage VBAT. When the battery voltage VBAT exceeds an overvoltage critical value, the charging switch 436 may be controlled to be in an off state.

In the embodiment, a load switch controller (SWL ctrl) 434 may measure a voltage value output by the battery 437.

When the load switch controller (SWL ctrl) 434 identifies that the battery voltage VBAT exceeds an operating voltage critical value, the load switch controller (SWL ctrl) 434 may perform control to make a load switch (SWL) 438 in the on state. When the load switch 438 is in the on state, the power from the battery 437 may be transmitted to a BLE communication circuit and a controller (BLE+controller) 439 (e.g., the communication circuit 290 and the processor 220 in FIG. 2). The load switch controller 434 may include an under-voltage lock-out (UVLO) circuit.

In the embodiment, the load switch 438 may supply power required to operate the BLE communication circuit and the controller 439 under the control of the load switch controller 434. The load switch 438 may control the connection between the BLE communication circuit, the controller 439, and the battery 437.

The BLE communication circuit and the controller 439 may operate by using the received power. A button control circuit 440 may transfer information on the input of the button to the BLE communication circuit and the controller 439 in the case that a distance between the electronic pen 201 and the electronic device 101 is longer than a critical distance. The BLE communication circuit and the controller 439 may transfer the information on the received button input to the electronic device 101 through an antenna 441 (e.g., the antenna 297 in FIG. 2).

A sensor 450 (e.g., the sensor circuit 299 in FIG. 2) may include a gyro sensor 451 and/or an acceleration sensor 452. Sensing data acquired by the gyro sensor 451 and/or the acceleration sensor 452 may be transmitted to the BLE communication circuit and the controller 439.

The BLE communication circuit and the controller 439 may transmit communication signals including the received sensing data to the electronic device 101 through the antenna 441. Alternatively, the BLE communication circuit and the controller 439 may identify the information (e.g., the coordinate and/or displacement the electronic pen 201) related to the position of the electronic pen 201 identified on the basis of the received sensing data. The BLE communication circuit and the controller 439 may transfer the information, which is related to the identified position of the electronic pen 201, to the electronic device 101 through the antenna 441.

The BLE communication circuit and the controller 439 may activate the acceleration sensor 452 in the case that the electronic pen 201 is withdrawn or detached from the electronic device 101. In the case that the button is pushed, the BLE communication circuit and the controller 439 may activate the gyro sensor 451. Meanwhile, the activation time point is just an example. The activation time point for each sensor is not limited. Further, the sensor 450 may further include a geomagnetic sensor. In the case that only the acceleration sensor 452 is activated, the electronic pen 201 may provide information on an acceleration, which is measured by the acceleration sensor 452, to the electronic device 101, and the electronic device 101 may operate on the basis of the information on the position and acceleration of the electronic pen 201 identified on the basis of the signal of the electronic pen.

Figure 5:
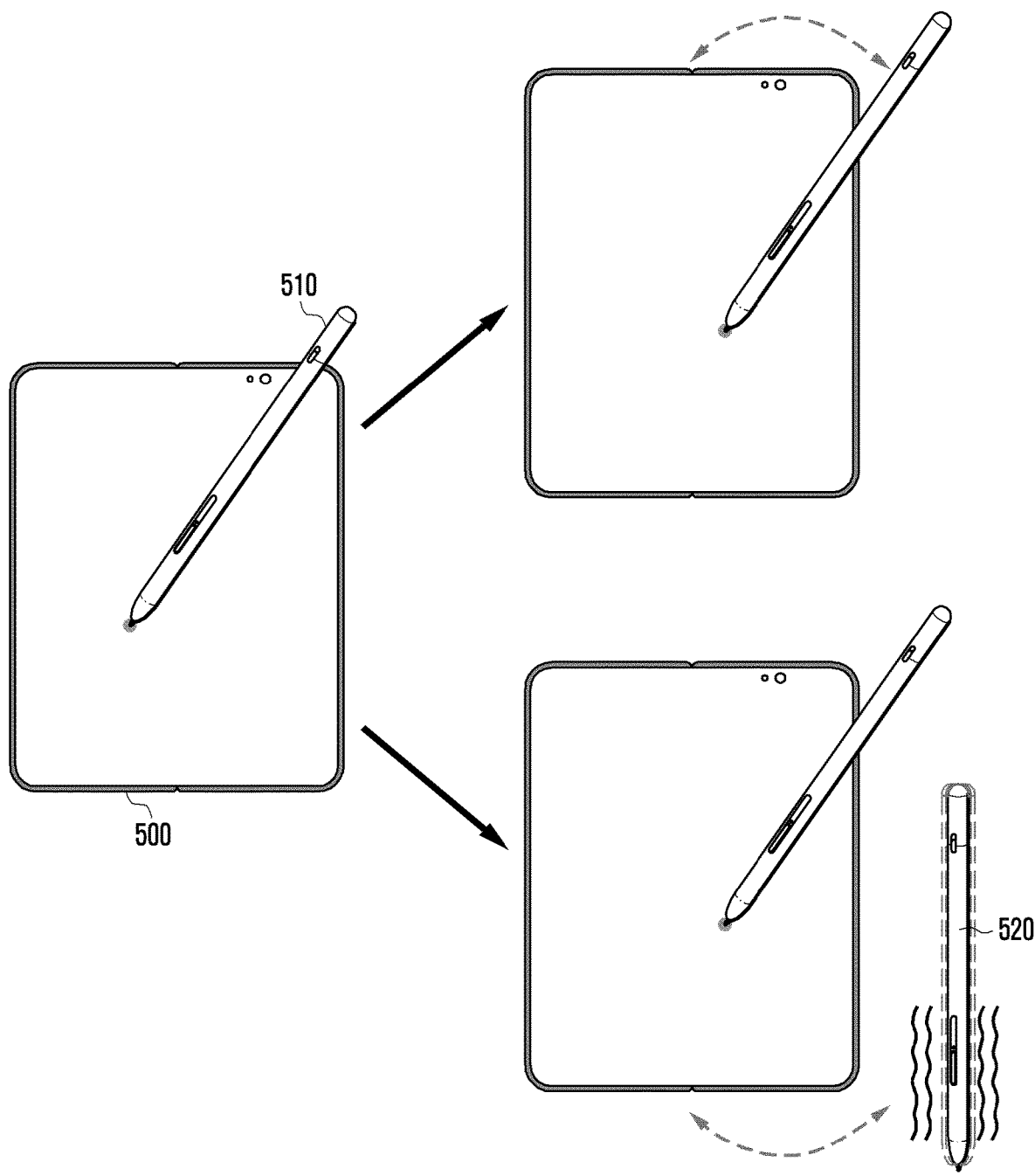
FIG. 5 is a view illustrating a configuration in which the electronic device according to various embodiments establishes communication connection with an electronic pen or transmits a notification signal to the electronic pen.

FIG. 5 is a view illustrating a configuration in which the electronic device 500 according to various embodiments establishes communication connection with the electronic pen or transmits a notification signal to the electronic pen 510.

With reference to FIG. 5, in the case that the electronic device is not in communication connection with a first electronic pen 510 that touches the display (e.g., the display 320 in FIG. 3), the processor (e.g., the processor 310 in FIG. 3) may establish the communication connection with the first electronic pen 510 or transmit a notification signal to a second electronic pen 520 in communication connection with the electronic device. According to various embodiments, the processor may identify whether the first electronic pen 510 and the electronic device 500 are in communication connection with each other. In the case that the touch input and the communication signal are received simultaneously, the processor may determine that the first electronic pen 510 is in communication connection with the electronic device 500. Alternatively, in the case that the touch input and the communication signal are received in the predetermined time interval, the processor may determine that the first electronic pen 510 is in communication connection with the electronic device 500. In the case that the touch input and the communication signal are not received simultaneously nor received in a predetermined time interval, the processor may determine that the first electronic pen 510 is not in communication connection with the electronic device 500.

According to various embodiments, in the case that it is determined that the first electronic pen 510 is not in communication connection with the electronic device 500, the processor may identify whether there is an electronic pen currently being in communication connection with the electronic device 500, i.e., the second electronic pen 520. According to the embodiment, in the case that no electronic pen is currently in communication connection with the electronic device 500, the processor may establish the communication connection with the first electronic pen 510. The processor may use the memory (e.g., the memory 340 in FIG. 3) and identify whether the electronic device has previously established the communication connection with the first electronic pen 510. In the case that the electronic device has previously established the communication connection with the first electronic pen 510, the processor may immediately establish the communication connection with the first electronic pen 510 without displaying a separate guide. According to the embodiment, the processor may display a menu for establishing the communication connection with the first electronic pen 510 on the display. In the case that the electronic device has not previously established the communication connection with the first electronic pen 510, the processor may output the guide screen for establishing the communication connection with the first electronic pen 510 to the display. The user may establish the communication connection with the first electronic pen 510 by using the guide screen and then use the first electronic pen 510.

According to another embodiment, in the case that the second electronic pen 520 is currently in communication connection with the electronic device 500, the processor may transmit the notification signal to the second electronic pen 520. The notification signal may be a signal that triggers vibration, sound, and/or light in the second electronic pen 520. For example, in the case that the processor transmits the signal, which triggers light, to the second electronic pen 520, the second electronic pen 520 may output light by using a light-emitting element in response to receiving the corresponding signal. The user may see the output light and identify that the second electronic pen 520 is in communication connection with the electronic device 500.

Figure 6A:
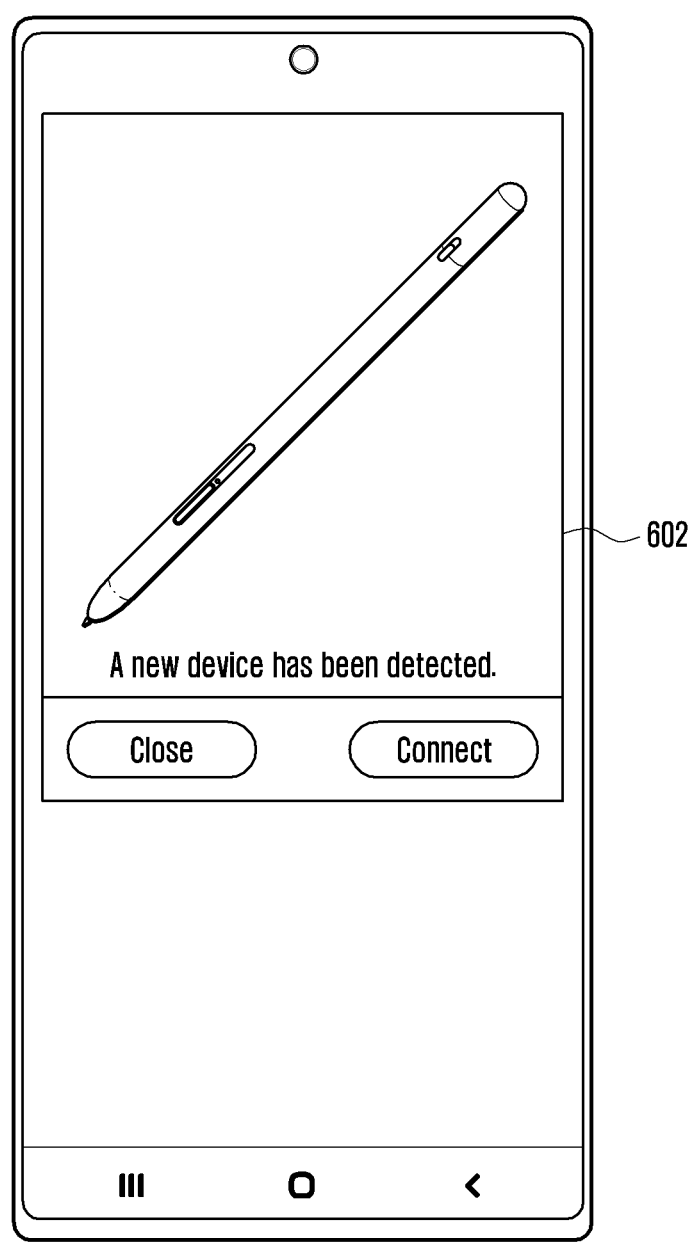
FIG. 6A is a view illustrating a guide screen that allows the electronic device according to various embodiments to establish the communication connection with the electronic pen.

FIG. 6A is a view illustrating the guide screen that allows the electronic device according to various embodiments to establish the communication connection with the electronic pen.

Figure 6B:
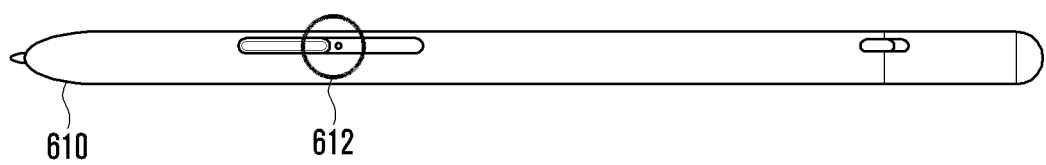
FIG. 6B is a view illustrating a configuration in which the electronic pen according to various embodiments provides a notification to a user by using a light-emitting element.

FIG. 6B is a view illustrating a configuration in which the electronic pen according to various embodiments provides a notification to the user by using the light-emitting element.

Figure 6C:
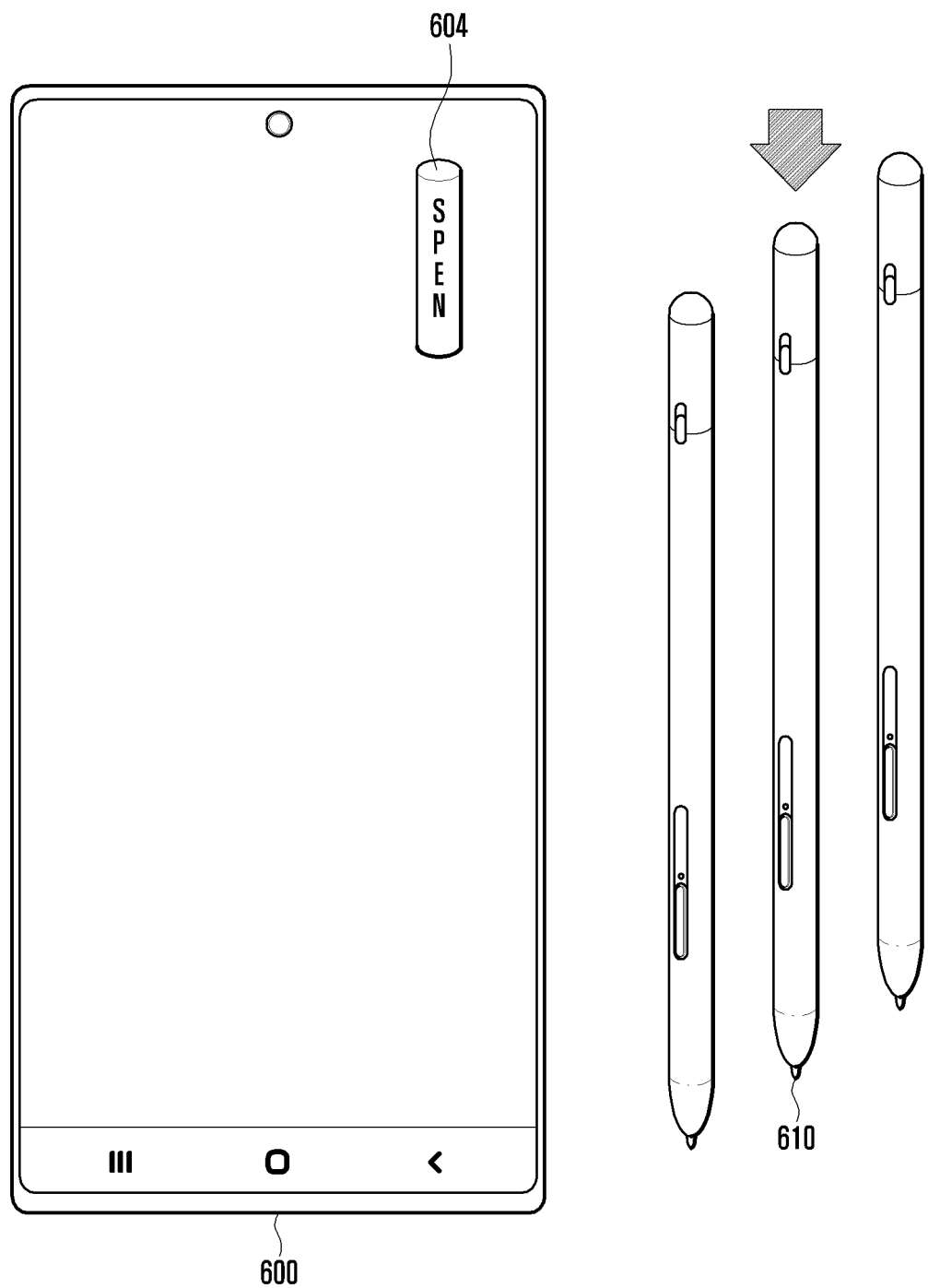
FIG. 6C is a view illustrating a configuration in which a graphic object is displayed on the electronic device in the case that a motion of the electronic pen that is in communication connection with the electronic device according to various embodiments is detected.

FIG. 6C is a view illustrating a configuration in which a graphic object is displayed on the electronic device in the case that a motion of the electronic pen being in communication connection with the electronic device according to various embodiments is detected.

With reference to FIG. 6A, the processor (e.g., the processor 310 in FIG. 3) may provide a guide for establishing communication connection with a new electronic pen. In the case that a touch input of the electronic pen to the display (e.g., the display 320 in FIG. 3) is received when there is no electronic pen being in communication connection with an electronic device 600, the processor may output a guide screen 602, which is illustrated in FIG. 6A, to establish the communication connection with the electronic pen that currently touches the display. For example, the guide screen 602 may include an image of the electronic pen that currently touches the display, a text indicating a new electronic pen is detected, and a menu for establishing communication connection with the electronic pen. The processor may establish the communication connection with the detected electronic pen on the basis of the user input to the communication connection menu.

With reference to FIG. 6B, an electronic pen 610 may include a configuration for providing a notification to the user in response to a notification signal received from the electronic device 600. For example, the electronic pen 610 may include at least one light-emitting element 612. The electronic pen 610 may output light by using the light-emitting element 612 in response to receiving the notification signal that triggers a light output from the electronic device 600. According to another embodiment, the electronic pen 610 may include a vibration motor. The electronic pen 610 may provide a notification to the user by generating vibration in response to receiving the notification signal that triggers vibration from the electronic device 600. According to another embodiment, the electronic pen 610 may include a speaker. The electronic pen 610 may provide a notification to the user by outputting a sound in response to receiving the notification signal that triggers a sound from the electronic device 600. The notification, which may be provided to the user by the electronic pen 610, is not limited to light, vibration, and sound. The electronic pen 610 may provide a notification to the user by using a plurality of notification methods.

With reference to FIG. 6C, the processor may display a graphic object 604 indicating the electronic pen 610 on the display on the basis of information on the motion of the electronic pen 610 being in communication connection with the electronic device 600. The processor may receive the motion information from the electronic pen 610 being in communication connection. The motion information may include information on a position, a velocity, and an acceleration of the electronic pen 610 acquired by the sensor circuit of the electronic pen 610. In the case that the motion of the electronic pen 610 is detected, the processor may output the graphic object 604, which indicates the electronic pen 610, on the display. On the basis of the user input to the graphic object 604, the processor may display information on the electronic pen 610 and provide a menu capable of controlling the electronic pen 610.

According to the embodiment, the processor may move and/or rotate the graphic object 604 in accordance with the motion and/or rotation of the electronic pen 610. The processor may acquire information on the position and placement direction of the electronic pen and display the graphic object 604 on the basis of the acquired information. For example, in the case that the first electronic pen is placed in a horizontal direction and the second electronic pen is placed in a vertical direction, the processor may display a first graphic object, which corresponds to the first electronic pen, in the horizontal direction on the display and display a second graphic object, which corresponds to the second electronic pen, in the vertical direction on the display. The processor may perform control so that the graphic object 604 moves in the same way as the electronic pen 610 on the basis of the information received from the electronic pen 610. For example, as the first electronic pen rotates from the horizontal direction to the vertical direction, the processor may output the first graphic object so that the first graphic object also rotates from the horizontal direction to the vertical direction. For example, as the first electronic pen moves in a right direction, the processor may output the first graphic object so that the first graphic object also moves in the right direction.

The electronic device according to various embodiments may include the display, the communication module, the memory, and the processor operatively connected to the display, the communication module, and the memory, in which the processor may be configured to receive the touch input of the first electronic pen to the display, identify whether the first electronic pen is connected to the electronic device through the communication module in response to receiving the touch input, identify whether there is an electronic pen connected to the electronic device in response to identifying that the first electronic pen is not connected to the electronic device, transmit the notification signal to the second electronic pen on the basis that a second electronic pen connected to the electronic device is present, and establish the communication connection with the first electronic pen on the basis of identifying that there is no electronic pen connected to the electronic device.

According to various embodiments, the processor may be configured to identify whether there is a communication signal received to the communication module in response to receiving the touch input, and determine that the first electronic pen does not establish the communication connection with the electronic device on the basis that the touch input is received but the communication signal is not received.

According to various embodiments, the processor may be configured to identify whether there is a communication signal received to the communication module in response to receiving the touch input, and determine that the first electronic pen establishes the communication connection with the electronic device and perform the predetermined function on the basis that the touch input and the communication signal are received simultaneously or in a predetermined time interval.

According to various embodiments, the processor may be configured to identify whether there is a record of previous connection of the first electronic pen in the memory, and establish the communication connection with the first electronic pen by using the communication module in response to identifying that there is the record of previous connection of the first electronic pen.

According to various embodiments, the processor may be configured to identify whether there is a record of previous connection of the first electronic pen in the memory, and output a pairing guide to the display in response to identifying that there is no record of connection of the first electronic pen.

According to various embodiments, the processor may be configured to output the second electronic pen and the graphic object, which indicates the state of the second electronic pen, to the display in response to receiving the motion information from the second electronic pen.

The electronic pen according to various embodiments may include the communication module, the memory, and the processor operatively connected to the communication module and the memory, the processor may be configured to transmit the communication signal to the electronic device in response to detecting the resonant frequency, receive a response signal corresponding to the communication signal, and transmit the control signal to the electronic device in response to receiving the response signal.

According to various embodiments, the electronic pen may further include at least one light-emitting element, and the processor may be configured to output light from the light-emitting element in response to receiving the notification signal from the electronic device.

According to various embodiments, the electronic pen may further include the vibration motor, and the processor may be configured to output the vibration notification by using the vibration motor in response to receiving the notification signal from the electronic device.

According to various embodiments, the electronic pen may further include a sensor module, and the processor may be configured to detect contact with the display of the electronic device by using the sensor module, and transmit the serial number to the electronic device in response to the contact with the electronic device.

Figure 7:
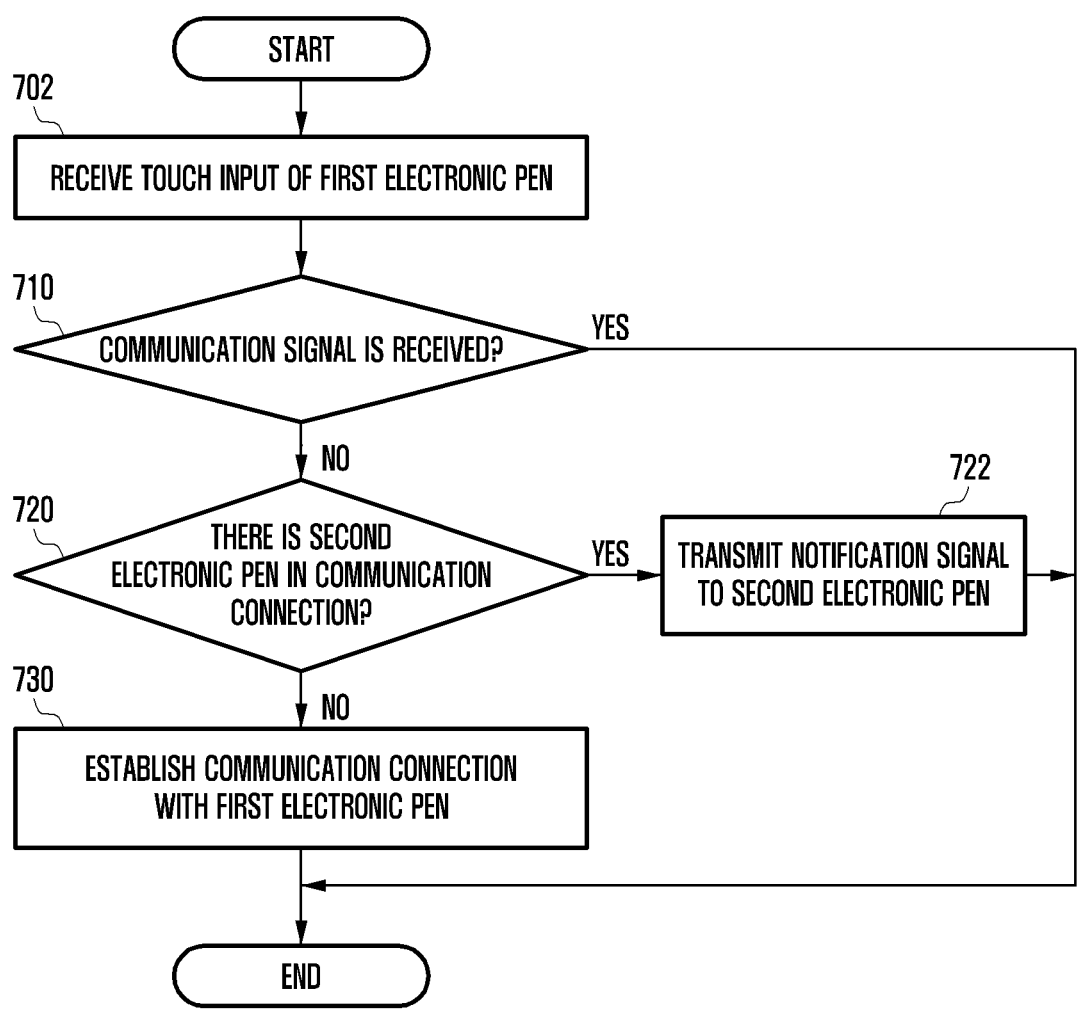
FIG. 7 is a flowchart illustrating a notification and connection method for the electronic pen and the electronic device according to various embodiments.

FIG. 7 is a flowchart illustrating a notification and connection method for the electronic pen the electronic device according to various embodiments.

The method illustrated in FIG. 7 may be performed by the electronic devices (e.g., the electronic device 101 in FIG. 1) described with reference to FIGS. 1 to 6. Hereinafter, the description of the above-mentioned technical feature will be omitted.

According to various embodiments, at operation 702, the electronic device may receive the touch input of the first electronic pen. The input, which may be received by the electronic device, may include an input signal, such as a hovering or button input, in addition to a physical touch input. The display (e.g., the display 320 in FIG. 3) may include the touch panel capable of detecting the touch input of the electronic pen. For example, when the user holds the first electronic pen and touches the display of the electronic device, the electronic device may use the touch panel and receive the touch input of the first electronic pen to the display.

According to various embodiments, at operation 710, the electronic device may identify whether a communication signal is received from an electronic pen. According to the embodiment, in the case that the electronic pen, which is in communication connection with the electronic device, touches the display, the electronic device may receive the communication signal simultaneously with the touch input or in a predetermined time interval. The communication signal may include the serial number of the electronic pen. Therefore, in the case that the electronic device receives the touch input of the electronic pen being in communication connection with the electronic device, the electronic device may also receive the communication signal. The electronic device may not receive the communication signal in the case that the electronic device receives the touch input of the electronic pen that is not in communication connection with the electronic device. According to the embodiment, in the case that the electronic device receives the touch input and the communication signal at the same time or in the predetermined time interval, the electronic device may determine that the electronic pen, which currently touches the display, is in communication connection with the electronic device. In the case that the electronic device does not receive the touch input and the communication signal at the same time or in the predetermined time interval, the electronic device may determine that the electronic pen, which currently touches the display, is not in communication connection with the electronic device.

According to various embodiments, the electronic device may perform a predetermined operation in response to determining that the first electronic pen is in communication connection with the electronic device. The electronic device may perform a predetermined operation in accordance with the touch input and/or the gesture of the electronic pen. For example, the electronic pen may perform various operations, such as information on pressure of the electronic pen, information on the battery state, or information on an event according to the button input through the display of the electronic device being in communication connection with the electronic pen.

In addition, the electronic pen may provide an air gesture function, and the air gesture function may include a button input (button press) function and a gesture function. In the case that the button input (button press) occurs on the electronic pen, a function mapped with a single input (single press) and/or a double input (double press) may be performed by the electronic device. In the case that the gesture occurs on the electronic pen, a function mapped with a left/right motion, an up/down motion, and/or a rotation may be performed by the electronic device. For example, when a gesture operation, such as a clockwise/counterclockwise gesture, occurs on the electronic pen while the electronic device executes a camera application, the electronic device may perform a zoom-in/out function. Alternatively, when a single input (single press) to the button provided on the electronic pen is detected, the electronic device may perform an image capturing (camera capture) function. When the double input (double press) is detected, the electronic device may perform a function of changing a front/rear camera.

In addition, in the case of the electronic pen, like a pointer displayed by using a general mouse, an air pointer, which moves in accordance with the motion of the electronic pen, may be provided to the electronic device. The air pointer may be differently displayed in accordance with the type of application being executed by the electronic device or the type of object included in the application being executed.

According to various embodiments, at operation 720, the electronic device may identify whether there is a second electronic pen that is currently in communication connection with the electrode device on the basis that the communication signal is not received. For example, in the case that the display receives the touch input of the first electronic pen without receiving the communication signal, the electronic device may use the communication module of the electronic device and identify whether there is an electronic pen that is in communication connection with the electronic device. According to the embodiment, the electronic device may identify that the second electronic pen that is in communication connection with the electronic device is present. According to another embodiment, the electronic device may identify that there is no electronic pen that is in communication connection with the electronic device.

According to various embodiments, at operation 722, the electronic device may transmit the notification signal to the second electronic pen on the basis that the second electronic pen is currently in communication connection with the electronic device. The notification signal may trigger at least one of a vibration, a sound, and a light to be emitted or produced by the second electronic pen. For example, the electronic device may transmit the notification signal, which triggers vibration, to the second electronic pen. The pen electronic device of the second electronic pen may receive the notification signal and operate a vibration motor. The user may identify that the electronic pen, which generates vibration, is in communication connection with the electronic device, and the user may touch the display with the corresponding pen.

According to various embodiments, at operation 730, the electronic device may establish the communication connection with the first electronic pen on the basis that there is no electronic pen currently being in communication connection with the electronic device. The electronic device may establish the communication connection with the first electronic pen by using the communication module. The electronic device may use the memory (e.g., the memory 340 in FIG. 3) and identify whether the first electronic pen has previously established the communication connection with the electronic device. According to the embodiment, in the case that there is a record indicating that the first electronic pen has previously established the communication connection with the electronic device, the electronic device may immediately establish the communication connection of the first electronic pen with the electronic device without a separate guide. According to another embodiment, in the case that the first electronic pen has not previously established the communication connection with the electronic device, the electronic device may output a guide for pairing the first electronic pen and the electronic device to the display. That is, the electronic device may provide the guide for the connection of the electronic pen when the electronic pen is initially connected to the electronic device.

The electronic device may display a menu icon capable of controlling the electronic pen on the display on the basis of a motion of the pen being in communication connection with the electronic device.

According to various embodiments, the electronic device may acquire information on the motion of the electronic pen from the electronic pen. The electronic pen may acquire information on the motion of the electronic pen from the sensor circuit. The electronic pen may transfer the acquired motion information to the electronic device. For example, in the case that the user picks up the electronic pen being in communication connection with the electronic device, the electronic device may receive information, which indicates that the user has come into contact with the corresponding electronic pen, from the electronic pen. For example, the electronic pen may detect user contact through an embedded touch sensor and transmit information on the user contact to the electronic device being in communication connection.

According to various embodiments, the electronic device may display a graphic object (e.g., menu icon), which is capable of controlling the electronic pen, on the display in response to acquiring the information on the motion of the electronic pen. For example, the electronic device may not display the graphic object when the user uses the electronic pen that is not in communication connection with the electronic device, and the electronic device may display the graphic object when the user may use the electronic pen that is in communication connection with the electronic device.

According to various embodiments, the electronic device may provide a menu capable of displaying information of the electronic pen and/or controlling the electronic pen on the basis of the user input related to the graphic object. For example, the electronic device may display the serial number and status of the electronic pen on the basis of the user input related to the graphic object. For example, the electronic device may provide a menu capable of releasing the communication connection with the electronic pen on the basis of the user input related to the graphic object.

Figure 8:
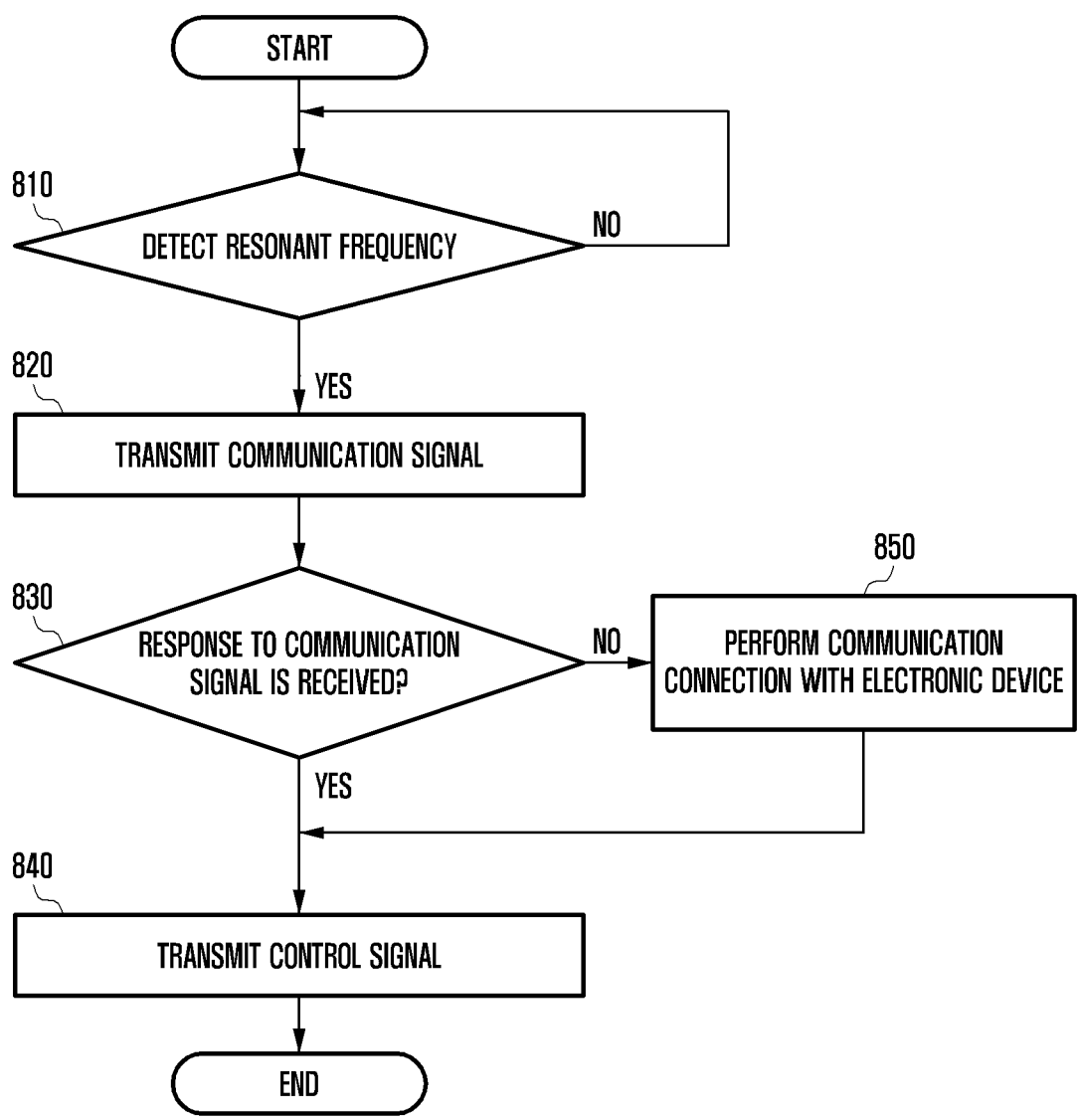
FIG. 8 is a flowchart illustrating operations of the electronic device and the electronic pen according to various embodiments.

FIG. 8 is a flowchart illustrating operations of the electronic device and the electronic pen according to various embodiments.

According to various embodiments, at operation 810, when the electronic pen approaches the vicinity of the display of the electronic device, the resonant frequency with the electronic device may be formed. When the resonant frequency in a predetermined range (e.g., 530 kHz to 595 kHz) is formed, the electronic pen may transmit the communication signal to the electronic device, at operation 820. In the state in which the electronic pen is in communication connection with the electronic device by using wireless communication, the electronic pen may receive a response signal to the transmitted communication signal from the electronic device, at operation 830. At operation 840, the electronic pen may transmit various control signals to the electronic device by using wireless communication in response to receiving the response to the communication signal. At operation 850, the electronic pen may perform the communication connection with the electronic device in the case that the electronic pen is not communication connection with the electronic device by using wireless communication. The electronic pen may transmit various control signals to the electronic device in the state in which the electronic pen is in communication connection with the electronic device. The electronic device may receive the control signal from the electronic pen and perform a predetermined function. For example, the electronic device may perform various functions such as an air gesture function of providing a function mapped with an up/down gesture, a left/right gesture, and/or a rotation when a gesture occurs on the electronic pen, and a function of an air pointer that moves in accordance with the motion of the pen.

According to various embodiments, the electronic device may establish the communication connection with a plurality of electronic pens. According to the embodiment, the electronic device may receive the touch input of the electronic pen to the display and establish the communication connection with the electronic pen on the basis of the received touch input. For example, the electronic device may receive the first touch input of the first electronic pen to the display and establish the communication connection with the first electronic pen. In the state in which the electronic device establishes the communication connection with the first electronic pen, the electronic device may receive a second touch input of the second electronic pen to the display and establish the communication connection with the second electronic pen. In the state in which the electronic device establishes the communication connection with the first electronic pen and the second electronic pen, the electronic device may receive a third touch input of a third electronic pen to the display and establish the communication connection with the third electronic pen. The method of allowing the electronic device to establish the communication connection with at least one pen is not limited to the above-mentioned embodiments.

According to various embodiments, the electronic device may output an indicator (e.g., guide message) and additionally establish the communication connection with a new electronic pen. For example, the electronic device may output the indicator for the communication connection with the electronic pen to the display in response to receiving the touch input of the electronic pen to the display. The electronic device may establish the communication connection with the electronic pen, which is in contact with the electronic device, on the basis of the user input to the indicator.

According to various embodiments, in the case that the electronic device is in communication connection with the plurality of electronic pens, the electronic device may output the graphic objects of the electronic pens while distinguishing the graphic objects. For example, in the case that the electronic device is in communication connection with the first electronic pen, the second electronic pen, and the third electronic pen, the electronic device may output a first graphic object, which corresponds to the first electronic pen, in a first color, output a second graphic object, which corresponds to the second electronic pen, in a second color, and output a third graphic object, which corresponds to the third electronic pen, in a third color. The features of the electronic device, which may be changed to distinguish the graphic objects corresponding to the plurality of electronic pens, is not limited to colors, but may include various visual and sensory features.

A notification and connection method for the electronic pen according to various embodiments may include receiving the touch input of the first electronic pen to the display, identifying whether the first electronic pen is connected to the electronic device through the communication module in response to receiving the touch input, identifying whether there is an electronic pen connected to the electronic device on the basis that the first electronic pen is not connected to the electronic device, transmitting a notification signal to the second electronic pen in response to identifying that there is a second electronic pen connected to the electronic device, and establishing the communication connection with the first electronic pen in response to identifying that there is no electronic pen connected to the electronic device.

According to various embodiments, the identifying of whether the first electronic pen establishes the communication connection with the electronic device may include identifying whether there is a communication signal received to the communication module in response to receiving the touch input, and determining that the first electronic pen does not establish the communication connection with the electronic device on the basis that the touch input is received, but the communication signal is not received.

According to various embodiments, the identifying of whether the first electronic pen establishes the communication connection with the electronic device may include identifying whether there is a communication signal received to the communication module in response to receiving the touch input, and determining that the first electronic pen establishes the communication connection with the electronic device and performing a predetermined function on the basis that the touch input and the communication signal are received simultaneously or in a predetermined time interval.

According to various embodiments, the establishing of the communication connection with the first electronic pen may include identifying whether there is a record of previous connection of the first electronic pen in the memory, and establishing the communication connection with the first electronic pen by using the communication module in response to identifying that there is the record of connection of the first electronic pen.

According to various embodiments, the establishing of the communication connection with the first electronic pen may include identifying whether there is a record of previous connection of the first electronic pen in the memory, and outputting a pairing guide to the display in response to identifying that there is no record of connection of the first electronic pen.

According to various embodiments, the notification and connection method may include outputting the second electronic pen and the graphic object, which indicates the state of the second electronic pen, to the display in response to receiving the motion information from the second electronic pen.

What is claimed is:

1. An electronic device comprising:
a display;
communication circuitry;
memory; and
at least one processor including processing circuitry, memory storing instructions that, when executed by the at least one processor individually or collectively, cause the electronic device to:
receive a touch input of a first electronic pen to the display;
identify whether the first electronic pen is connected to the electronic device through the communication circuitry in response to receiving the touch input;
identify whether a second electronic pen is connected to the electronic device in response to identifying that the first electronic pen is not connected to the electronic device;
transmit a notification signal to the second electronic pen in response to identifying that the second electronic pen connected to the electronic device is present; and
establish communication connection with the first electronic pen in response to identifying that the second electronic pen is not connected to the electronic device.

2. The electronic device of claim 1, wherein the memory stores instructions cause the electronic device to:
identify whether there is a communication signal received to the communication circuitry in response to receiving the touch input; and
determine that the first electronic pen does not establish the communication connection with the electronic device on the basis that the touch input is received, but the communication signal is not received.

3. The electronic device of claim 1, wherein the memory stores instructions cause the electronic device to:
identify whether there is a communication signal received to the communication circuitry in response to receiving the touch input; and
determine that the first electronic pen establishes the communication connection with the electronic device and perform a predetermined function on the basis that the touch input and the communication signal are received simultaneously or in a predetermined time interval.

4. The electronic device of claim 1, wherein the memory stores instructions cause the electronic device to:
identify whether there is a record of previous connection of the first electronic pen in the memory; and
establish the communication connection with the first electronic pen by using the communication circuitry in response to identifying that there is the record of connection of the first electronic pen.

5. The electronic device of claim 1, wherein memory stores instructions cause the electronic device to:
identify whether there is a record of previous connection of the first electronic pen in the memory; and
output a pairing guide to the display in response to identifying that there is no record of connection of the first electronic pen.

6. The electronic device of claim 1, wherein the memory stores instructions cause the electronic device to output the second electronic pen and a graphic object, which indicates a state of the second electronic pen, to the display in response to receiving motion information from the second electronic pen.

7. A notification and connection method for an electronic pen, the notification and connection method comprising:
receiving a touch input of a first electronic pen to a display;
identifying whether the first electronic pen is connected to an electronic device through communication circuitry in response to receiving the touch input;
identifying whether a second electronic pen is connected to the electronic device in response to identifying that the first electronic pen is not connected to the electronic device;
transmitting a notification signal to the second electronic pen in response to identifying that the second electronic pen connected to the electronic device is present; and
establishing communication connection with the first electronic pen in response to identifying that the second electronic pen is not connected to the electronic device.

8. The notification and connection method of claim 7, wherein the identifying of whether the first electronic pen establishes the communication connection with the electronic device comprises:

identifying whether there is a communication signal received to the communication circuitry in response to receiving the touch input; and determining that the first electronic pen does not establish the communication connection with the electronic device on the basis that the touch input is received, but the communication signal is not received.

9. The notification and connection method of claim 7, wherein the identifying of whether the first electronic pen establishes the communication connection with the electronic device comprises:

identifying whether there is a communication signal received to the communication circuitry in response to receiving the touch input; and determining that the first electronic pen establishes the communication connection with the electronic device and performing a predetermined function on the basis that the touch input and the communication signal are received simultaneously or in a predetermined time interval.

10. The notification and connection method of claim 7, wherein the establishing of the communication connection with the first electronic pen comprises:

identifying whether there is a record of previous connection of the first electronic pen in a memory; and establishing the communication connection with the first electronic pen by using the communication circuitry in response to identifying that there is the record of connection of the first electronic pen.

11. The notification and connection method of claim 7, wherein the establishing of the communication connection with the first electronic pen comprises:

identifying whether there is a record of previous connection of the first electronic pen in a memory; and outputting a pairing guide to the display in response to identifying that there is no record of connection of the first electronic pen.

* * * * *